US008319957B2

(12) United States Patent
Chen et al.

(10) Patent No.: US 8,319,957 B2
(45) Date of Patent: Nov. 27, 2012

(54) INTRUSION DETECTING SYSTEM WITH POLARIZATION DEPENDENT SENSING ELEMENTS

(75) Inventors: Xin Chen, Corning, NY (US); Michael Etienne, Painted Post, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 385 days.

(21) Appl. No.: 12/432,222

(22) Filed: Apr. 29, 2009

(65) Prior Publication Data

US 2010/0277719 A1 Nov. 4, 2010

(51) Int. Cl.
*G01N 21/00* (2006.01)

(52) U.S. Cl. .......................................................... 356/73.1

(58) Field of Classification Search .................. 356/73.1
See application file for complete search history.

(56) References Cited

U.S. PATENT DOCUMENTS

| | | | | |
|---|---|---|---|---|
| 5,194,847 | A | 3/1993 | Taylor et al. | 340/557 |
| 5,222,810 | A * | 6/1993 | Kleinerman | 374/161 |
| 7,173,690 | B2 | 2/2007 | Haran | 356/73.1 |
| 7,190,442 | B1 | 3/2007 | Chen et al. | 356/73.1 |
| 2003/0231296 | A1 * | 12/2003 | Huang et al. | 356/73.1 |
| 2008/0100828 | A1 * | 5/2008 | Cyr et al. | 356/73.1 |

FOREIGN PATENT DOCUMENTS

GB 2445364(A) 7/2008

OTHER PUBLICATIONS

"Birefringe measurement in optical fibers by polarization-optical time-domain reflectometry"; J. Neil Ross; Applied Optics; Oct. 1, 1982; vol. 21; No. 19; p. 3489-3495.

"Development of fiber optic BOTDA sensor for intrusion detection", Kwon et al; Sensors and Actuators A 101 (2002); p. 77-84.

"Distributed fiber-optic intrusion sensor system"; Juarez et al; Journal of Lightwave Technology; vol. 23, No. 6, Jun. 2005; pp. 2081-2087.

Distributed optical fiber vibration sensor based on spectrum analysis of polarization-OTDR system; Zhang et al; Optics Express, Jul. 7, 2008; vol. 16, No. 14; p. 10240-10247.

"Low coherence interferometry for the monitoring of civil engineering structures"; Inaudi et al; Paper presented at the Second European Conference on Smart Structures and Materials; Glasgow 1994, Session 6; p. 216-219.

"Spectrally stable Er-Fiber laser for application in phase-sensistive optical time-domain reflectometry"; Choi et al; IEEE Photomics Technology Letters; vol. 15, No. 3, Mar. 2003; p. 386-388.

* cited by examiner

*Primary Examiner* — Tarifur Chowdhury
*Assistant Examiner* — Abdullahi Nur
(74) *Attorney, Agent, or Firm* — Matthew J. Mason

(57) ABSTRACT

A detection system includes a length of optical fiber and an OTDR coupled to the optical fiber. The OTDR includes a radiation source providing pulsed radiation to the fiber, a detector detecting radiation that is backscattered through the fiber, and a processor capable of analyzing the variation of the radiation that is backscattered through the fiber. At least two polarization dependent sensing elements are positioned along the length of optical fiber.

20 Claims, 11 Drawing Sheets

INTRUSION DETECTING SYSTEM WITH POLARIZATION DEPENDENT SENSING ELEMENTS

FIELD OF THE INVENTION

The present invention relates generally to a method and system for detecting a disturbance along the length of the fiber, and particularly to a method and system that utilizes Optical Time Domain Reflectometry (OTDR) for identifying such disturbance.

TECHNICAL BACKGROUND

The last decade has witnessed a renewed interest in security and perimeter monitoring. Sensitive sites such as nuclear power plants, water treatment systems, oil pipelines, and military facilities, are consistently under the threat of perimeter breaching from unwanted intruders. Such facilities require around the clock monitoring by a fail safe system requiring minimum human intervention. Historically, perimeter monitoring has relied heavily on infrared sensors and cameras, heat and motion detectors, vibrational and seismic perturbations. However, these systems are relatively poor performers, mostly un-concealable and require extensive capital investment. A fiber-based intrusion detection system, either buried or wall-mounted along a perimeter, addresses these specific issues related to implementation, cost practicality, concealment and accuracy.

In most fiber-based intrusion detection systems, pulses of light are launched into an optical fiber, by way of an Optical Time Domain Reflectometer (OTDR). Minute impurities ($<<\lambda$) randomly distributed inside the fiber scatter light in all directions. The portion of this scattered light that is reflected back to the OTDR is known as Rayleigh backscattered signal. Fiber-based intrusion sensing, for the most part, relies on characterizing the different parameters embedded within that Rayleigh backscattered signal coming from the fiber.

SUMMARY

Disclosed herein is a detection system. The detection system includes a length of optical fiber and an OTDR coupled to the optical fiber. The OTDR includes a radiation source providing pulsed radiation to the fiber, a detector that detects radiation that is backscattered through the fiber, and a processor that is capable of analyzing the variation of the radiation that is backscattered through the fiber. At least two polarization dependent sensing elements are positioned along the length of optical fiber.

Also disclosed herein is a method for detecting a disturbance along a length of optical fiber. The method includes emitting pulsed radiation into a length of optical fiber. The method also includes measuring radiation that is backscattered through the optical fiber. In addition, the method includes analyzing the variation of the measured radiation to produce information related to change in the measured radiation over time along the length of the fiber. At least two polarization dependent sensing elements are positioned along the length of optical fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
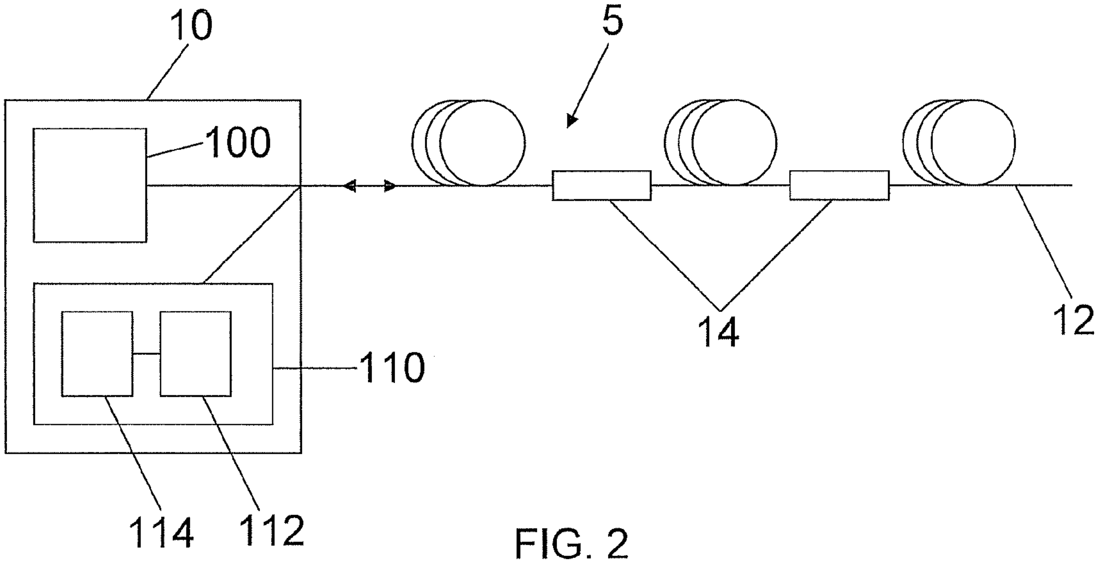
FIG. 1 illustrates schematically a detection system according to one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts.

In a fiber optic time domain reflectometer based detection system, a temporal pulse (typically 10 nanoseconds (ns) to 10 milliseconds (ms)) of light is launched into an optical fiber (sensing fiber). As this pulse propagates through the sensing fiber, some of its energy is backscattered due to Rayleigh scattering, often referred to as a Rayleigh backscattered signal (RBS). The optical characteristics of the backscattered light are dependent upon the fibers' physical and optical properties. When the sensing fiber is broken, bent, or otherwise disturbed, the characteristics of the backscattered light change, and the change can be detected and analyzed.

If a local portion of the sensor fiber is disrupted, then analysis of the change in backscattered light can be used to locate the resultant disturbance along the length L of the fiber. Optical instruments that measure the intensity of the backscattered light along the length of the fiber are, for example, Optical Time Domain Reflectometers (OTDRs). More specifically, the OTDR trace or backscattered trace provides information on the intensity of the backscattered light.

Other information, such as polarization, or loss of light can be derived from the information on signal intensity of the backscattered light and analyzed. In particular, due to geometric asymmetry and strain, optical waveguide fibers carry birefringence. Upon disturbance, a change in the localized birefringence induces a variation in polarization, which can induce a change in both the transmitted power level and the Rayleigh backscattered signal (RBS).

When an optical pulse is injected into a fiber used for perimeter intrusion sensing by way of an OTDR, a time-resolved RBS is returned to the OTDR, referred to herein as a backscattered trace. A backscattered trace returned to the OTDR prior to any significant physical disturbance to the fiber is referred to herein as a background reference trace. When making comparisons against this background reference trace, ODTRs, due to the broadband nature of their emitted pulses, are usually not, in and of themselves, sufficient for detecting power fluctuations resulting from small polarization changes in a fiber, such as a change that can result from intrusion. Therefore, fiber-based detection systems typically do not rely on merely coupling a standard, off-the-shelf OTDR with a sensing fiber. Instead, they require the use of more expensive equipment, such as a Brillouin-OTDR (B-OTDR).

The embodiments disclosed herein provide a fiber-based detection system that does not require the use of relatively expensive equipment to time-resolve polarization-related parameters. In particular, embodiments disclosed herein provide a fiber-based detection system that is sensitive enough to detect intrusion using a standard, off-the-shelf OTDR as a radiation source and a detector, and a standard single mode fiber as a sensing fiber. Embodiments described herein provide such a system, wherein along at least two portions of the length of optical fiber, the system includes a polarization dependent sensing element.

As used herein, a "polarization dependent sensing element" is an element positioned along a length of optical fiber that, when pulsed radiation from an OTDR source is passed through the fiber, translates a change in the polarization vector components of such radiation upon disturbance to the fiber into a measurable change in the Rayleigh backscattered signal (RBS) detected by the OTDR.

Each polarization dependent sensing element can be characterized by polarization dependent loss (PDL). PDL is a measure of the peak-to-peak difference in transmission of an optical component or system with respect to all possible states of polarization. It is the ratio of the maximum and the minimum transmission of an optical device with respect to all polarization states and is expressed in dB units.

As shown in FIG. 1, a detection system 5 (also referred to herein as a sensing system) includes an optical time domain reflectometer OTDR 10, which is capable of sending pulses of laser light down an optical waveguide fiber (sensing fiber). OTDR 10 includes transmitter 100 that acts as a radiation source to provide pulsed radiation to sensing fiber 12 and a receiver leg 110 that includes a detector 112 to detect radiation that is backscattered through sensing fiber 12, and a signal processor 114 for analyzing the variation of the radiation that is backscattered through sensing fiber 12 and providing a signal response output indicative of a disturbance. That is, the OTDR is capable of injecting a series of optical pulses into the sensing fiber. The OTDR can also extract, from the same end of the sensing fiber, light that is scattered back. The intensity of the return pulses is measured and integrated as a function of time, and is plotted as a function of position in fiber (along its length). A temporal pulse of light is launched into an optical fiber (sensing fiber). The pulse duration is preferably 2 ns to 1 μs, and more preferably 50 ns to 500 ns. As shown in FIG. 1, the OTDR 10 launches pulsed radiation into the sensing fiber 12, which is deployed at or around the area where the fiber may be disturbed, for example by an intruder, or by structure deterioration. At least two polarization dependent sensing elements 14 are positioned along the length of the sensing fiber 12. As a result of Rayleigh backscattering, some light is back reflected or scattered by and through the fiber 12 towards the OTDR 10.

Figure 2:
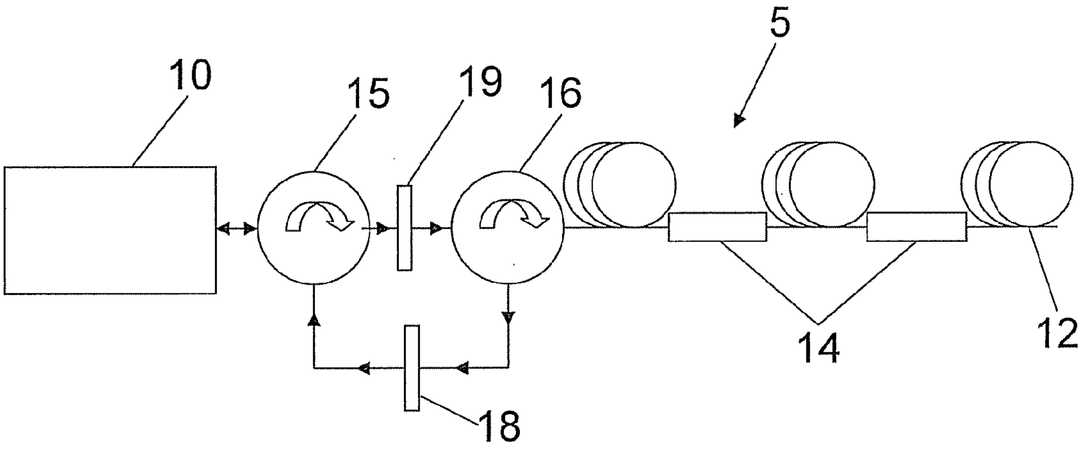
FIG. 2 illustrates schematically a detection system according to another embodiment of the present invention.

FIG. 2 illustrates an alternative embodiment, wherein backscattered pulses are diverted back to the OTDR 10 through a different path. For example, in the embodiment illustrated in FIG. 2, the backscattered pulse is directed through a polarization analyzer 18 (which can be simply a polarizer) before the backscattered light reaches the detector inside the OTDR. (The polarization analyzer 18 enables the detector to have polarization sensitivity). In other embodiments (not shown), the polarization analyzer 18 comprises a combination of at least a waveplate (e.g., ½ or ¼ waveplate) and a polarizer. In the embodiment illustrated in FIG. 2, the detection system utilizes two optical circulators 15 and 16 and two polarizers 18 and 19. The optical circulators 15 and 16 are configured to loop the initial pulse of light emitted from the OTDR 10 to the sensing fiber 12. At least two polarization dependent sensing elements 14 are positioned along the length of the sensing fiber 12. The arrangement illustrated in FIG. 2 allows more light to return to the OTDR 10 if the optical pulses emitted by the OTDR are already polarized, which is the case for some commercial OTDRs. When the OTDR emission is already polarized (i.e. as in the case of a POTDR), the polarizer 19 between optical circulator 15 and optical circulator 16 is not needed, thus one source of loss is eliminated, which can help to gain longer dynamic range for the POTDR.

Figure 3:
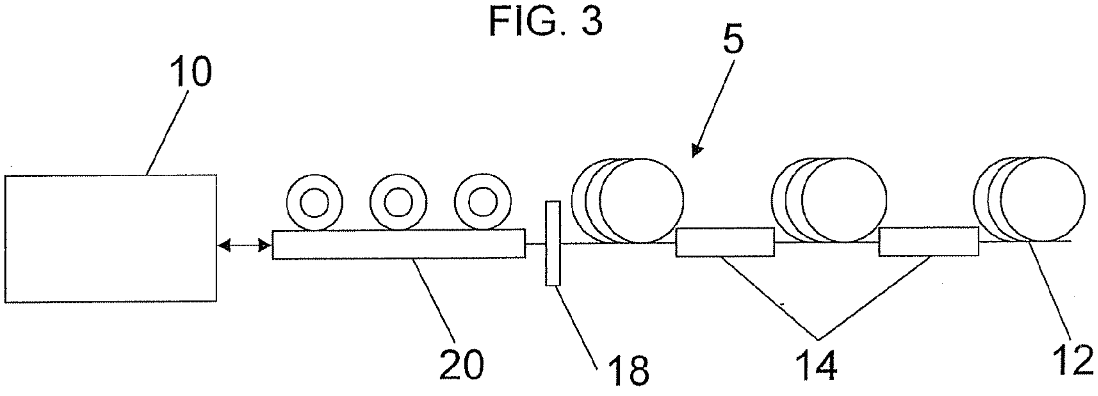
FIG. 3 illustrates schematically a detection system according to yet another embodiment of the present invention.

FIG. 3 illustrates another alternative embodiment, utilizing a POTDR while not using the optical circulators which were utilized in the embodiment illustrated in FIG. 2. In the embodiment illustrated in FIG. 3, OTDR 10 launches the pulse light through a polarization controller 20, which is employed to maximize the amount of light launched into the sensing fiber 12. At least two polarization dependent sensing elements 14 are positioned along the length of the sensing fiber 12. The polarization controller's purpose is to align the state of polarization in the sensing fiber 12 to be incident on the polarizer 18. Some simple polarization controllers include one or more levers attached at different locations along the length of and on the outer periphery of the sensing fiber 12 so that the lever can be moved to twist a segment of sensing fiber 12, so that the state of polarization in the sensing fiber 12 can be properly adjusted to maximize the amount of light that goes through the polarizer 18. After the pulse light travels through the polarization controller 20, it is then directed through the polarizer 18 and then into the sensing fiber 12.

Polarization dependent sensing elements 14 shown in FIGS. 1-3, act as disturbance amplifiers to substantially increase the sensitivity of detection system 5. In each of the embodiments illustrated in FIGS. 1-3, OTDR 10 launches a linearly polarized optical pulse into sensing fiber 12 and the backscattered light is continually analyzed and stored for reference. Intrusion or disturbance causes a local change in the fiber birefringence, which results in new polarization vector components. When the new polarization vector components reach the polarization dependant sensing elements 14, the polarization dependent sensing elements 14 translate the change in polarization vector components resulting from the intrusion or disturbance into a measurable change in the Rayleigh backscattered signal (RBS) detected by OTDR 10.

Preferably, detection system 5 includes at least 2 polarization dependent sensing elements, such as at least 4 polarization dependent sensing elements, and further such as at least 10 polarization dependent sensing elements, and even further such as at least 50 polarization dependent sensing elements, and yet even further such as at least 100 polarization dependent sensing elements, and still yet even further such as at least 200 polarization dependent sensing elements. Preferably, the distance between polarization dependent sensing elements is at least 25 meters, such as at least 50 meters, and further such as at least 100 meters, and even further such as at least 500 meters, and yet even further such as at least 1,000 meters, and still yet even further such as at least 2,000 meters.

For example in a preferred embodiment, detection system 5 includes at least 4 polarization dependent sensing elements, wherein the distance between polarization dependent sensing elements is at least 50 meters, such as at least 100 meters, and further such as at least 200 meters, and even further such as at least 500 meters.

In addition to translating a change in polarization vector components resulting from intrusion or disturbance into a measurable change in the RBS detected by OTDR 10, polarization dependent sensing elements 14 each induce a certain amount of polarization dependent loss (PDL), to the radiation that is backscattered through the fiber to the OTDR 10. Generally, the greater amount of PDL induced by sensing elements 14, the more measurable the change in RBS detected by OTDR 10.

Preferably, each polarization dependent sensing element 14 induces a polarization dependent loss (PDL) of at least 0.2 dB along the length of the optical fiber along which the polarization dependent sensing element 14 is positioned, such as a PDL of at least 0.5 dB along the length of the optical fiber, and further such as a PDL of at least 1.0 dB along the length of the optical fiber, and yet even further such as a PDL of at least 2.0 dB along the length of the optical fiber. In certain embodiments disclosed herein, each polarization dependent sensing element 14 induces a polarization dependent loss (PDL) of at least 10 dB along the length of the optical fiber, such as a PDL of at least 20 dB along the length of the optical fiber.

The amount of PDL induced by each polarization dependent sensing element 14 affects the overall power budget of the system. In this regard, the greater the amount of PDL induced by each polarization dependent sensing element 14, the fewer the number of polarization sensing elements that can be used in a given system. Conversely, the lesser the amount of PDL induced by each polarization dependent sensing element 14, the greater the number of polarization sensing elements that can be used in a given system.

For example, when each polarization dependent sensing element 14 induces a polarization dependent loss of between 0.2 dB and 1.0 dB, a perimeter of at least 25 kilometers can be monitored. Such a system can include, for example, an OTDR 10 with a 50 dB dynamic range and at least 50 polarization dependent sensing elements spaced apart at 500 meter intervals or less.

In addition, when each polarization dependent sensing element 14 induces a polarization dependent loss of at least 10 dB, a perimeter of at least 4 kilometers can be monitored. Such a system can include, for example, an OTDR 10 with a 50 dB dynamic range and at least 2 polarization dependent sensing elements spaced apart at 2,000 meter intervals or more.

In some embodiments, polarization dependent sensing element 14 comprises fiber which is mechanically stressed by subjecting the fiber to mechanically induced microbending. By "microbending", it is meant that the fiber is subjected to at least 180° of bending over a length of two millimeters or less. For example, optical fiber can be subjected to mechanically induced microbending by placing the fiber in a microbending gear rack. A microbending gear rack, as used herein, is a device that includes two opposing plates wherein optical fiber is sandwiched between the plates such that at least one length of the fiber sandwiched between the plates is subjected to at least 180° of bending over a length of two millimeters or less.

Figure 4A:
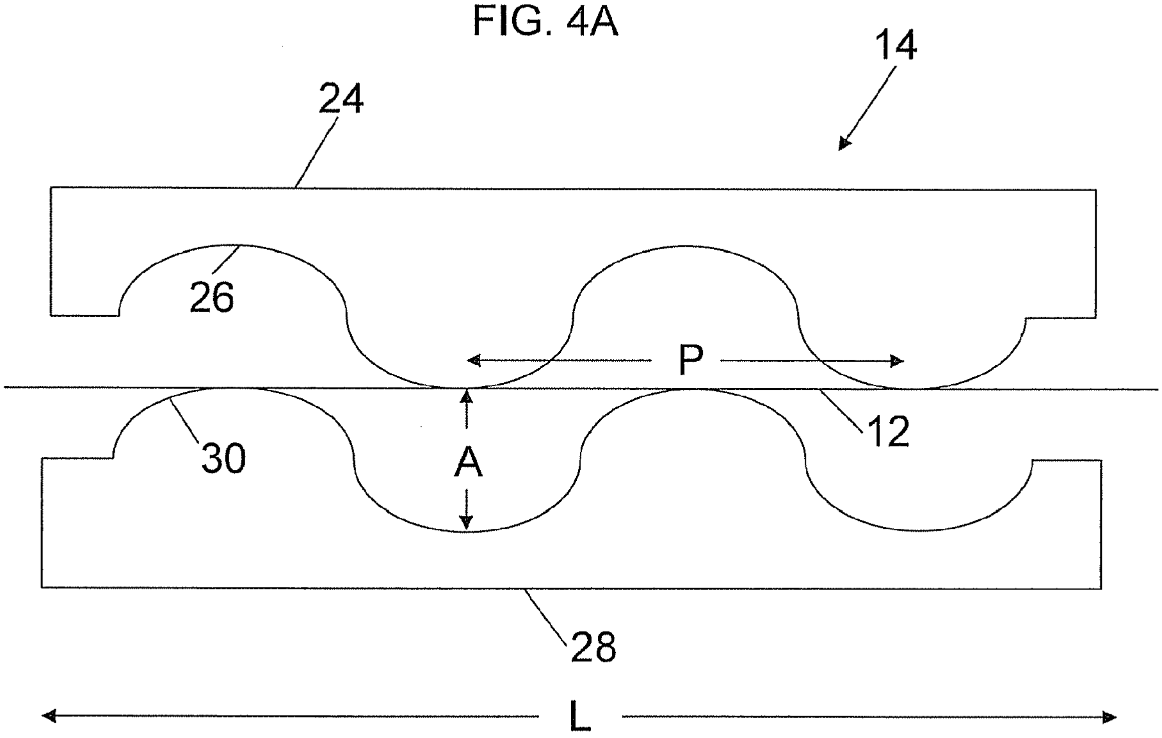
FIGS. 4A and 4B illustrate an embodiment of a polarization dependent sensing element that includes optical fiber subjected to mechanically induced microbending.
Figure 4B:
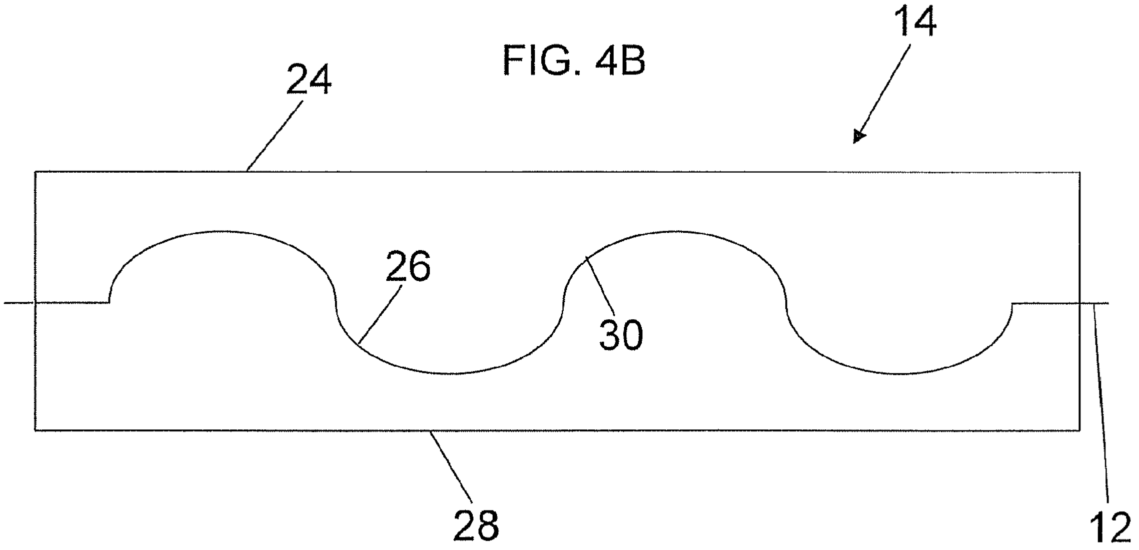

FIGS. 4A and 4B illustrate an embodiment of a polarization dependent sensing element 14 that includes optical fiber subjected to mechanically induced microbending. Polarization dependent sensing element 14 includes a microbending gear rack that includes a first plate 24 having a first corrugated surface 26 and a second plate 28 having a second corrugated surface 30. In the embodiment shown in FIG. 4, each of first and second plate have a length L, and each of first and second corrugated surfaces have an amplitude A and a period P. Sensing fiber 12 is passed between corrugated surface 26 and corrugated surface 30. As pressure is applied between first plate 24 and second plate 28, sensing fiber 12 is compressed between the plates and bends are mechanically introduced to the fiber (FIG. 4B).

Figure 5:
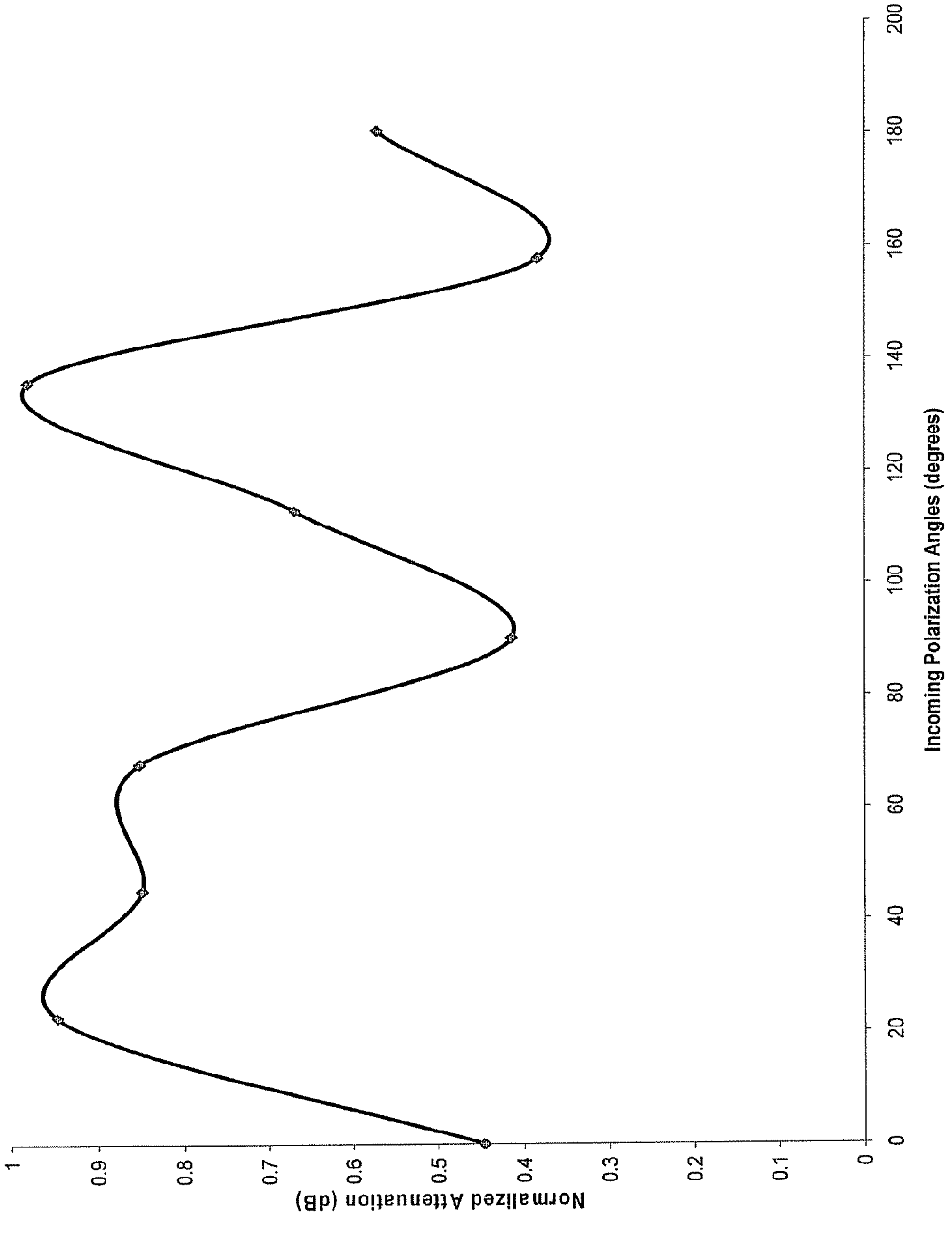
FIG. 5 illustrates the relationship between polarization angle and attenuation of an exemplary single mode fiber subjected to microbending stresses.

When bends of a certain amplitude and period are mechanically introduced to a given optical fiber as illustrated in FIG. 4B, optical power loss via mode coupling occurs. This mode coupling exhibits a polarization dependent component, meaning that the fiber will preferentially transmit incoming radiation at certain polarization states while reflecting or coupling radiation at other polarization states. An example of this effect is illustrated in FIG. 5, wherein polarization dependence of microbending loss is shown in single mode optical fiber in a microbending gear rack having corrugated surfaces with a period of 1.9 millimeters.

Upon disturbance to the system, the polarization state of incoming radiation to polarization dependent sensing element 14 changes, resulting in a differing optical power loss via mode coupling than was present prior to the disturbance. This differing optical power loss results in a change in the RBS detected by OTDR 10.

Preferably, microbending gear rack is at least 1 centimeter in length (i.e., first plate 24 and second plate 28 each have a length L of at least 1 centimeter) and first corrugated surface 26 and second corrugated surface 30 each have a period P of from 0.5 millimeters to 2 millimeters, thereby inducing a bend period of from 0.5 millimeters to 2 millimeters to sensing fiber 12. Preferably, first corrugated surface 26 and second corrugated surface 30 each have an amplitude A of from 25 μm to 2 millimeters, such as from 50 μm to 1 millimeter, and further such as from 100 μm to 0.5 millimeters.

Figure 6:
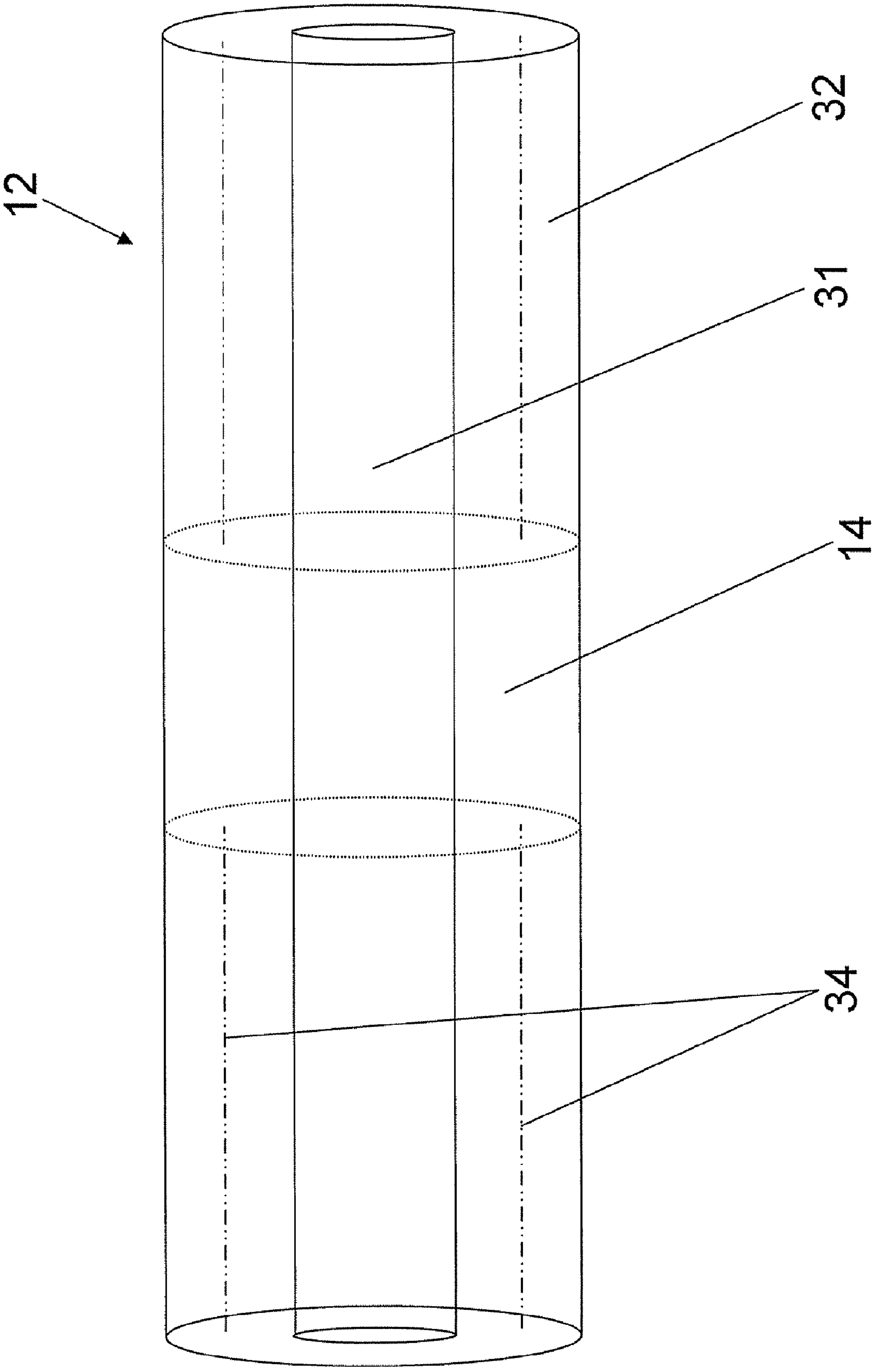
FIG. 6 illustrates an embodiment of a polarization dependent sensing element having an optical fiber with collapsed airlines.

FIG. 6 illustrates an embodiment of an alternative polarization dependent sensing element 14, showing sensing fiber 12 including core 31 and cladding 32, wherein cladding 32 includes a plurality of airlines 34 and polarization dependent sensing element 14 includes a region wherein the airlines are collapsed or absent. An example of an optical fiber that includes a plurality of airlines is Corning Clear Curve® single mode optical fiber. The airlines can be collapsed to form polarization dependent sensing element 14 by heating a length of fiber in the region where the airlines are to be collapsed using, for example, a fusion splicer. Preferably, the length of the collapsed airline region is from about 0.5 centimeters to about 2 centimeters such as from about 0.75 centimeters to about 1.5 centimeters, including about 1 centimeter.

Sensing fiber 12 is relatively microbend insensitive in regions where the airlines are not collapsed and relatively microbend sensitive in regions where the airlines are collapsed. However, in either region, the fiber is not insensitive to pressure or stress resulting from disturbance or intrusion. Intrusion or disturbance causes a local change in the fiber birefringence, which results in new polarization vector components. When the new polarization vector components reach the region where the airlines are collapsed, the collapsed region acts as a polarization dependent sensing element 14 and translates the change in polarization vector components resulting from the intrusion or disturbance into a measurable change in the Rayleigh backscattered signal (RBS) detected by OTDR 10.

Polarization dependent sensing elements 14 can also include inline fiber based polarizers. Inline fiber based polarizers are components that include sections of optical fiber that allow transmission of only a single polarization. Examples of optical fiber that allow transmission of only a single polarization include Corning® Single Polarization Specialty Fiber optimized for 1310 and 1550 nm wavelengths. These can each be expected to induce relatively large PDL such as at least 10 dB, and further such as at least 20 dB.

Radiation detected or measured by OTDR 10 is analyzed to determine the time, location, and magnitude of any intrusion or disturbance to the system. Preferably, the variation of the radiation measured by OTDR 10 is analyzed to produce information related to the time, location, and magnitude of any intrusion or disturbance to the system.

In a preferred embodiment, the step of measuring radiation that is backscattered through sensing fiber 12 includes measuring at least one background reference trace prior to any intrusion or significant disturbance to the system 5. As pulses of radiation are transmitted and backscattered over time through sensing fiber 12, the difference between this radiation and the at least one background reference trace taken at an earlier time or before the disturbance or an intrusion event occurs is calculated and referred to as a "difference trace." The variation of this difference trace is continually measured and analyzed to determine the time, location, and magnitude of any intrusion or disturbance to the system 5.

In particularly preferred embodiments, the location of the intrusion or disturbance is identified by calculating the standard deviation of the difference trace over a window (for example, around 1 km width) and by sliding such window during the calculation over the whole length of sensing fiber 12. In a particularly preferred embodiment, a moving standard deviation of a baseline difference trace is provided by calculating the standard deviation of the difference of at least two background reference traces over a window and by sliding such window during the calculation over the whole length of sensing fiber 12. The higher moving standard deviation values of this baseline difference trace provide a "peiturbation threshold", and a difference trace standard deviation value substantially above this perturbation threshold, provides the position of the site of the disturbance. Preferably, the width W of the sliding window is between 50 m and 2 km (i.e., 50 m≦W≦2 km). For example, the width W may be 100 m≦W≦2 km, or 100 m≦W≦1 km.

In particularly preferred embodiments, the location of the intrusion or disturbance may also be identified by utilizing autocorrelation, such as is described in Example 4 below.

Preferably, detection system 5 is capable of detecting a fiber disturbance within 20 meters of the actual location of the disturbance, such as within 10 meters of the actual location of the disturbance, and further such as within 5 meters of the actual location of the disturbance, and even further such as within 2 meters of the actual location of the disturbance.

EXAMPLES

The invention will be further clarified by the following examples.

Example 1

An HP 8147 OTDR outputting 10 ns pulses at a wavelength of 1550 nm, was used to launch optical pulses into an unjacketed single mode optical fiber having a length of 50 kilometers. At a distance of about 9.8 kilometers along the fiber, a paddle polarization controller with 3 paddles was used to simulate intrusion effects, followed by a microbending gear rack having a length of about 3 centimeters and opposing corrugated surfaces having a period of about 1 millimeter and an amplitude of about 400 μm. The microbending gear rack was mounted on a translation stage coupled to a load cell that allows determination as to the amount of force applied onto the fiber. The distance between the polarization controller and microbending gear rack was 20 meters. This same polarization controller and microbending gear rack configuration was repeated 80 meters beyond the first microbending gear rack. A LabView VI controlled the OTDR, compared new backscattered traces with stored background reference traces, and displayed the resulting difference traces.

Figure 7:
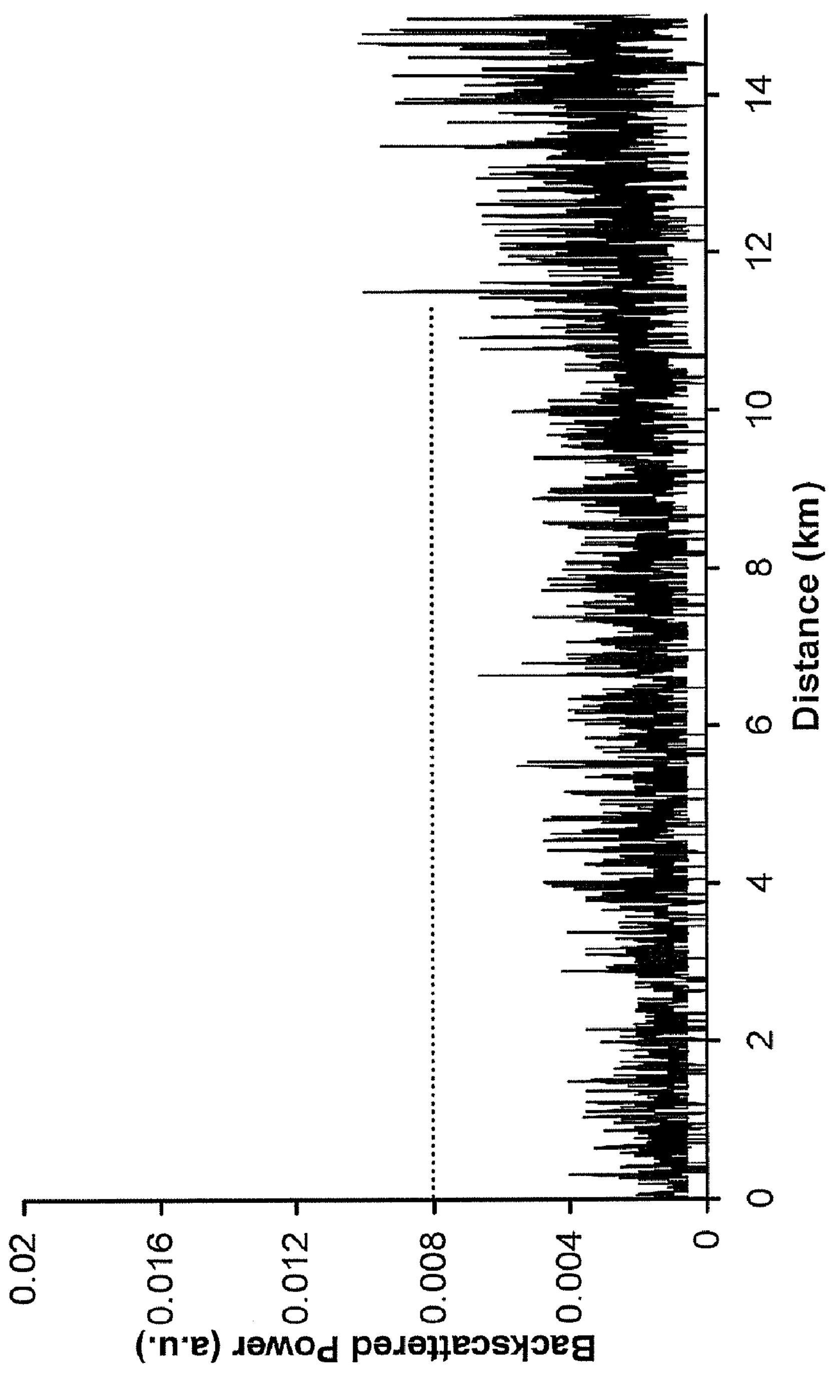
FIG. 7 shows the moving standard deviation between two background reference traces plotted against position along a longitudinal axis of an optical fiber.

A moving standard deviation of a baseline difference trace was established by taking and storing a first 15 second background trace, taking and storing a second 15 second background trace, and then calculating the moving standard deviation of the difference between the first and second background traces. FIG. 7 shows the moving standard deviation of the difference between the first and second background difference traces over a distance of about 15 kilometers. Using this as a baseline, a perturbation threshold of 0.008 a.u. of backscattered power was established.

Figure 8A:
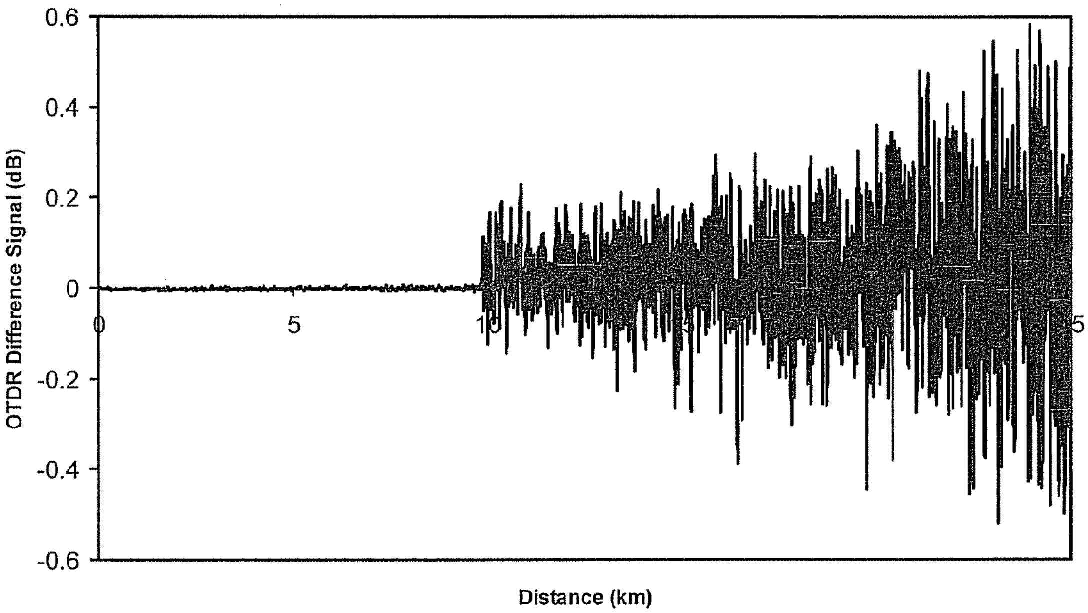
FIG. 8A shows a difference trace plotted against position along a longitudinal axis of an optical fiber wherein the optical fiber has been subjected to a disturbance.
Figure 8B:
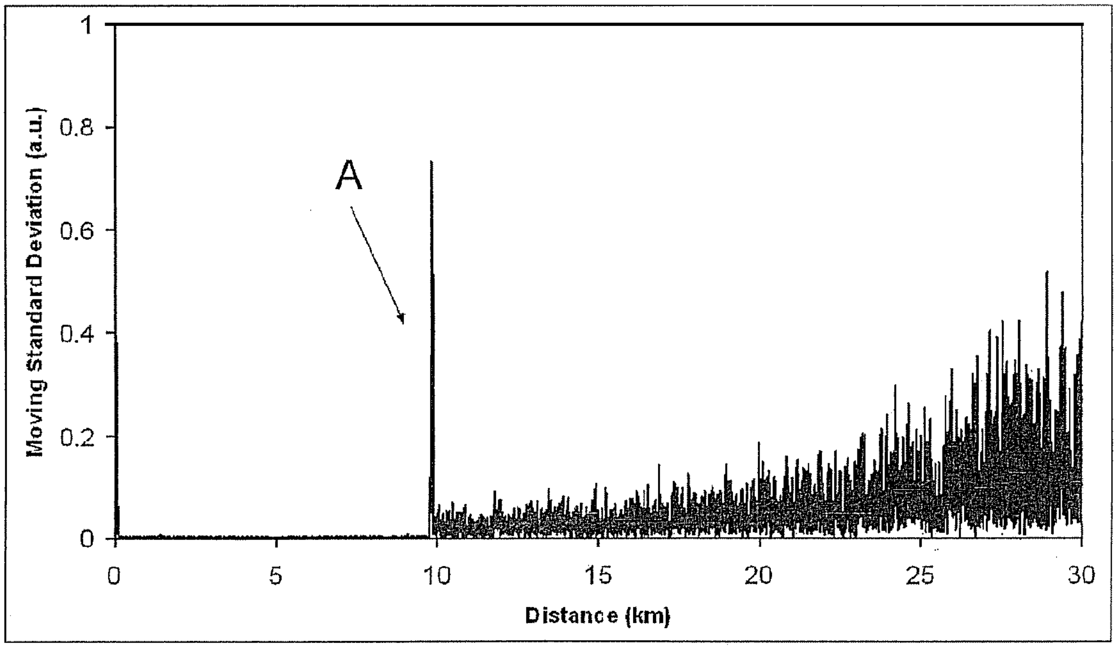
FIG. 8B shows a moving standard deviation of the difference trace shown in FIG. 8A.

A paddle on the polarization controller nearer to the ODTR was then pushed to simulate a disturbance. This movement resulted in a polarization change of the incoming light, causing mode coupling to occur where the fiber was subjected to microbending, inducing a noticeable change in the RBS, and allowing for pinpointing of the time and location of the disturbance. The resulting difference trace is shown in FIG. 8A and the resulting moving standard deviation and intrusion location A is shown in FIG. 8B.

Example 2

Figure 9A:
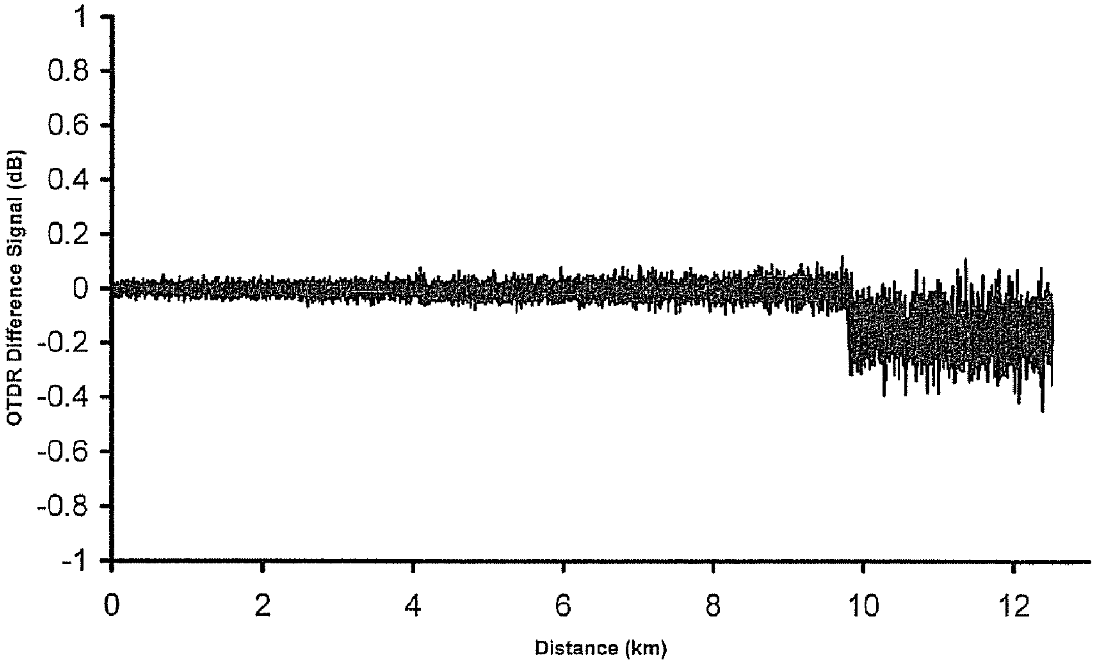
FIG. 9A shows a difference trace plotted against position along a longitudinal axis of an optical fiber wherein the optical fiber has been subjected to a disturbance at a different location than that shown in FIG. 8A.
Figure 9B:
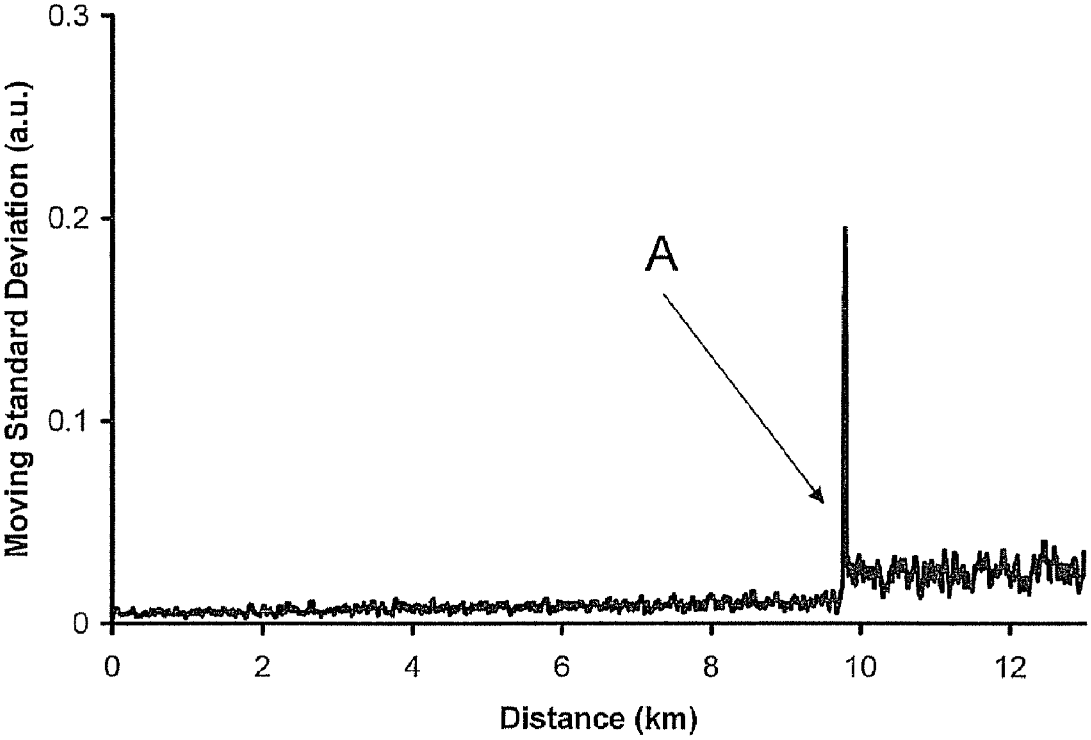
FIG. 9B shows a moving standard deviation of the difference trace shown in FIG. 9A.

The experimental conditions set forth in Example 1 were repeated except instead of moving a paddle on the polarization controller nearer to the ODTR, a paddle on the polarization controller farther from the ODTR was moved. This movement also resulted in a polarization change of the incoming light, causing mode coupling to occur where the fiber was subjected to microbending, inducing a noticeable change in the RBS, allowing for pinpointing of the time and location of the disturbance. The resulting difference trace is shown in FIG. 9A and the resulting moving standard deviation and intrusion location A is shown in FIG. 9B.

Example 3

Figure 10:
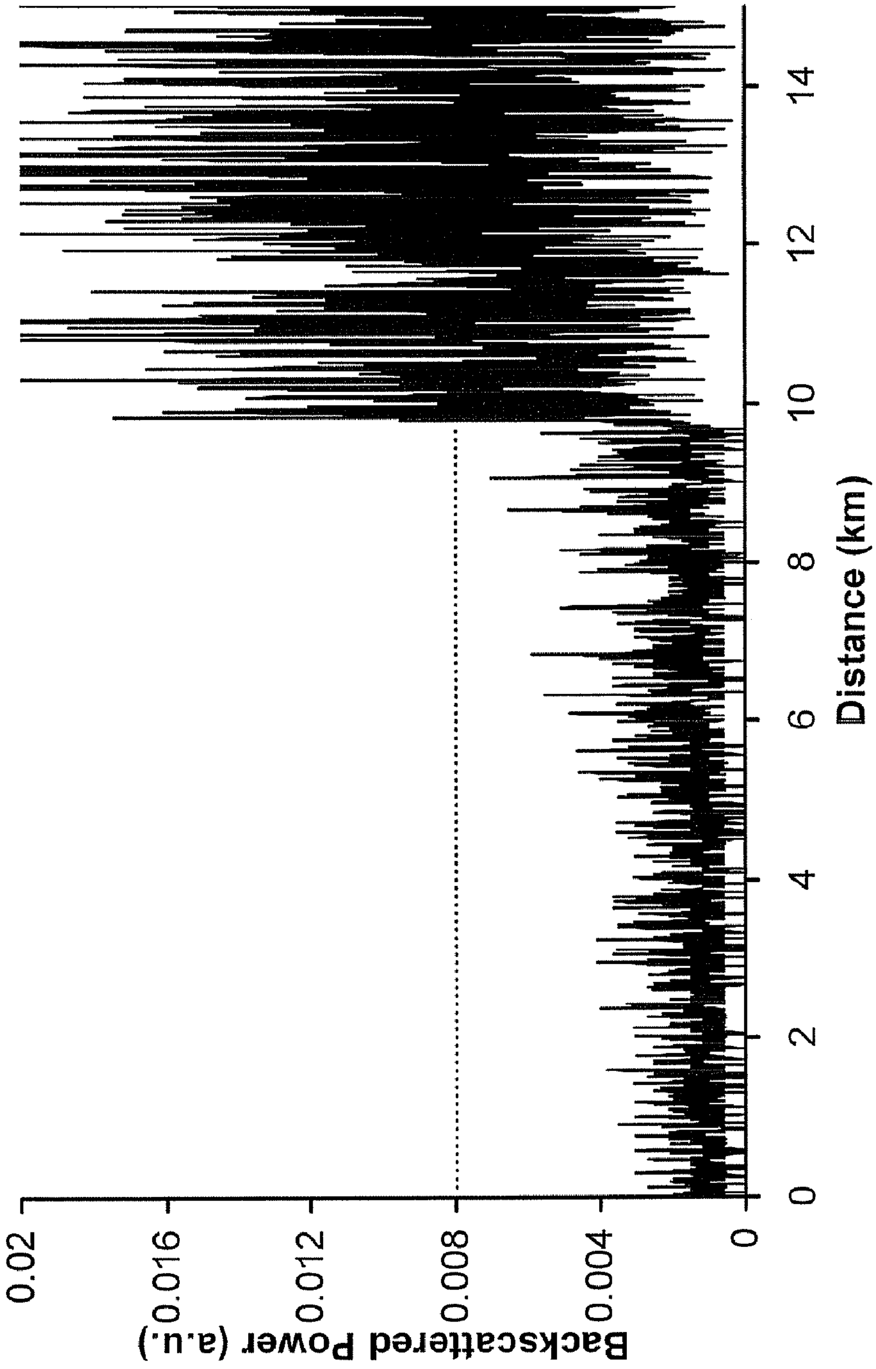
FIG. 10 shows a moving standard deviation of a difference trace plotted against position along a longitudinal axis of an optical fiber wherein the optical fiber has been subjected to a disturbance of a different type than shown in FIGS. 8A-9B.

The experimental conditions set forth in Examples 1 and 2 were repeated except both polarization controllers were removed and hardcover books were placed over a portion of the fiber between the microbending gear racks (i.e., at a distance of between about 9.82 and 9.9 kilometers along the fiber). The pressure of the weight of the books resulted in a polarization change of the incoming light, causing mode coupling to occur where the fiber was subjected to microbending, inducing a noticeable change in the RBS, allowing for pinpointing of the time and location of the disturbance. The resulting moving standard deviation of the difference trace is shown in FIG. 10. While the detected signal in this example is about an order of magnitude lower than in Examples 1 and 2, it was still well above the perturbation threshold of 0.008 a.u.

Example 4

In this example, the polarization dependent sensing elements were two inline polarizers containing Corning® Single Polarization Specialty Fiber. The experimental layout was the same as in Example 1 except a standard single mode dead zone fiber with a length of about 1.05 km was directly connected to the OTDR followed by a first polarizer. The first polarizer was followed by a first standard single mode sensor fiber having a length of 2 kilometers, which was followed by a second polarizer. The second polarizer was followed by a second sensor fiber having a length of 2 kilometers. Each sensor fiber was wound on a spool with 30 centimeter diameter without tension and a portion in the middle was made accessible for disturbance. The bending induced by winding the fiber on the spools introduces little birefringence and, for the purposes of this example, the condition is essentially the same as when the fiber is deployed in the field or in straight condition.

Each polarizer plays dual roles. First, each polarizer polarizes the light going into the sensor fiber. Second, for the scattered light returning to the OTDR, each polarizer serves as an analyzer so that the polarization evolution along the fiber can exhibit itself through the intensity change along the fiber. A benefit of using two polarizers is that the state of polarization launched into the second sensor fiber can be made to be the same or substantially identical as that being launched into the first sensor fiber regardless what happens before the light reaches the second polarizer and the second sensor fiber.

Figure 11A:
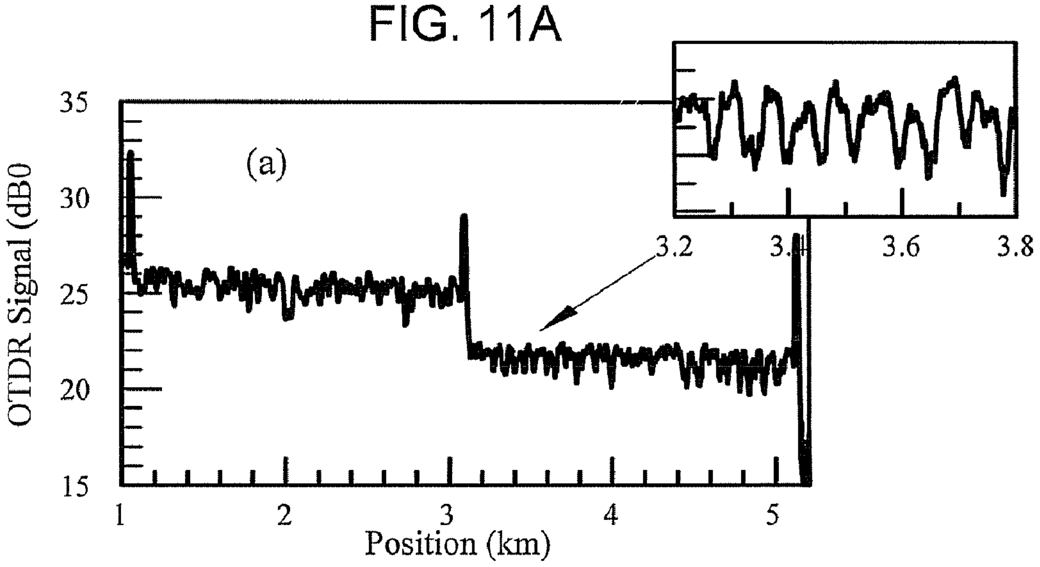
FIGS. 11A-11C show exemplary backscattered traces at three different times, $t_1$-$t_3$ respectively, plotted against position along a longitudinal axis of an optical fiber.
Figure 11B:
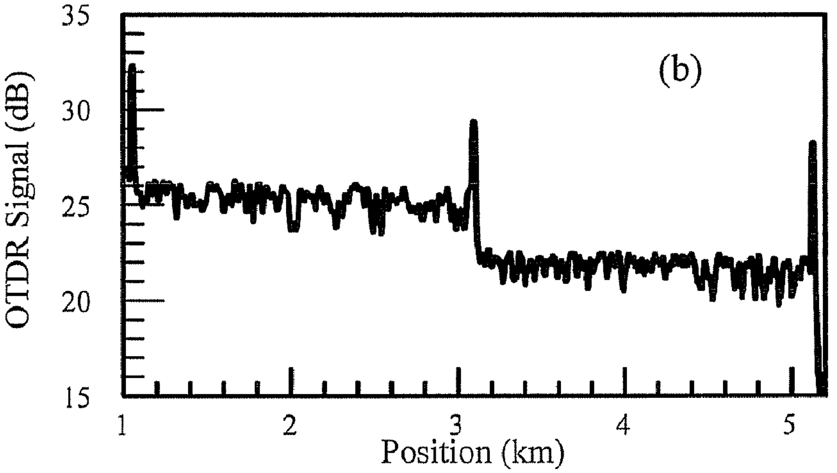
Figure 11C:
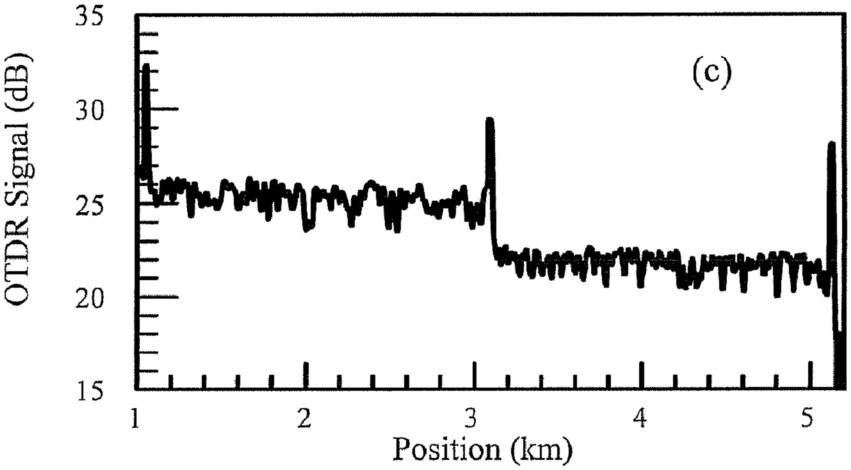

The backscattered traces were obtained at three different moments, t1, t2, t3, over a two minute time span, as shown if FIGS. 11A-11C, respectively, where t3>t2>t1. At t1 (FIG. 11A), no disturbance has occurred. Between t1 (FIG. 11A) and t2 (FIG. 11B), a disturbance occurred in the middle of the first sensor fiber at a distance of about 2.10 kilometers from the OTDR by slightly bending the first sensor fiber. Between t2 (FIG. 11B) and t3 (FIG. 11C), a second disturbance occurred in the middle of the second sensor fiber at a distance of about 4.12 kilometers from the OTDR by slightly bending the second sensor fiber. The drop of the backscattered trace level from the first sensor fiber to the second sensor fiber is due to the second polarizer, which trims the power of the light from one principle polarization state. In FIG. 11A, a portion of the backscattered trace is zoomed in, which clearly shows the quasi-periodic intensity variation along the fiber.

Figure 12A:
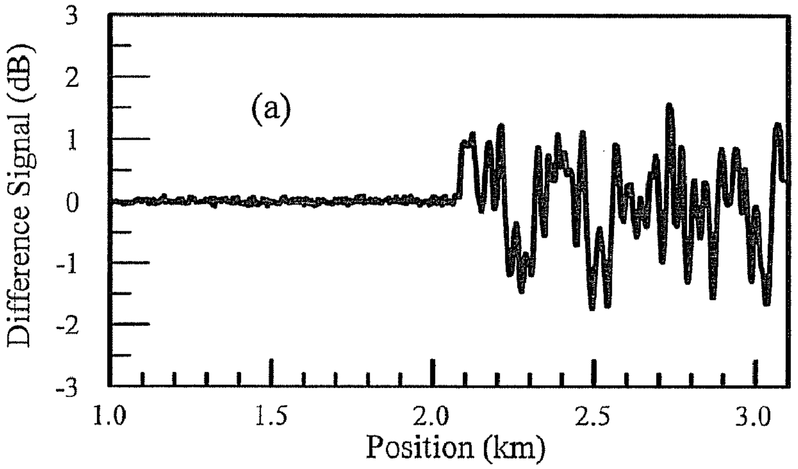
FIGS. 12A-12C show difference traces of the backscattered traces of FIGS. 11A-11C plotted against position along a longitudinal axis of an optical fiber.

Processing of the data to recover the location of the disturbance can be accomplished by at least two methods. A first method involves calculating the difference between backscattered traces obtained at two different moments. Because two polarizers are used, the polarization evolution in the first sensor fiber and the second sensor fiber are unrelated, so data for each portion of the fiber can be processed separately. In order to determine the disturbance between t1 and t2 in first sensor fiber, the difference between the backscattered trace obtained at t2 and the one obtained at t1 (i.e., the "difference trace") was calculated, as shown in FIG. 12A. The first polarizer causes polarization evolution to be converted into intensity variation along the fiber. For the portion that was not disturbed, the polarization would evolve in the same way, resulting in essentially zero value in the difference trace. From the position the fiber is disturbed and beyond, the polarization evolves in a differently, resulting in a varying value in the difference trace (i.e., the starting position of the variation in the difference trace is the position of the disturbance). In this case, the position of the disturbance was located at 2.10 km (relative to the output port of the OTDR).

Figure 12B:
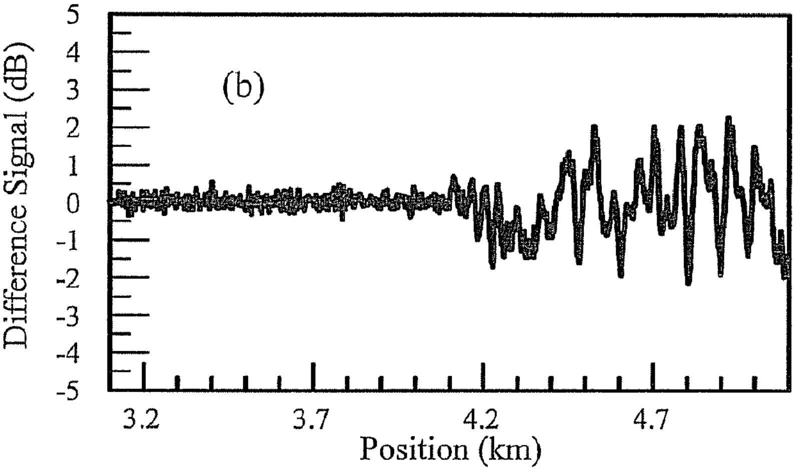
Figure 12C:
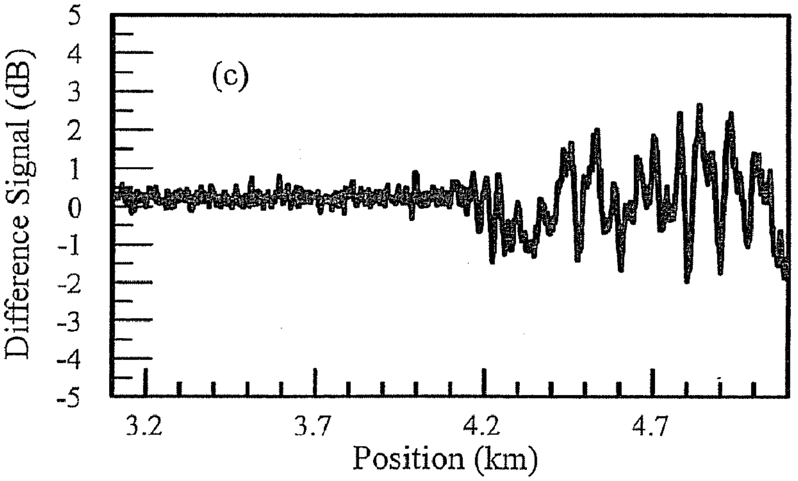

To find the site of the disturbance in the second sensor fiber, which occurred between t2 and t3, the difference from backscattered traces obtained at t3 and t2 (i.e., the "difference trace") was calculated, as shown in FIG. 12B. From this, it was determined that the disturbance was located at 4.10 km (relative to the output port of the OTDR). As the disturbance in the first sensor fiber has no effect on the polarization evolution in the second sensor fiber, the difference trace from backscattered traces from t3 and t1 was calculated as shown in FIG. 12C. Even with a disturbance happening after t1, the site of disturbance can be determined in a similar manner as that illustrated in FIG. 12B and was found to be 4.12 km (relative to the output port of the OTDR).

Figure 13A:
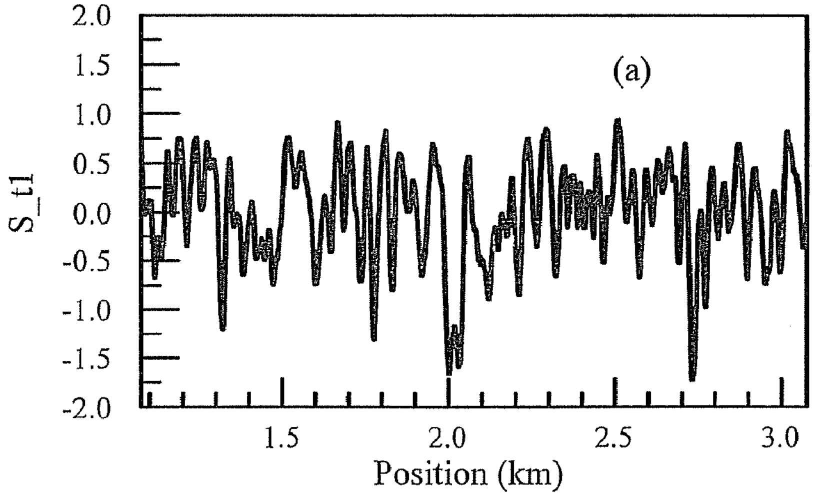
FIGS. 13A and 13B show exemplary processed traces at two different times plotted against position along a longitudinal axis of an optical fiber.
Figure 13B:
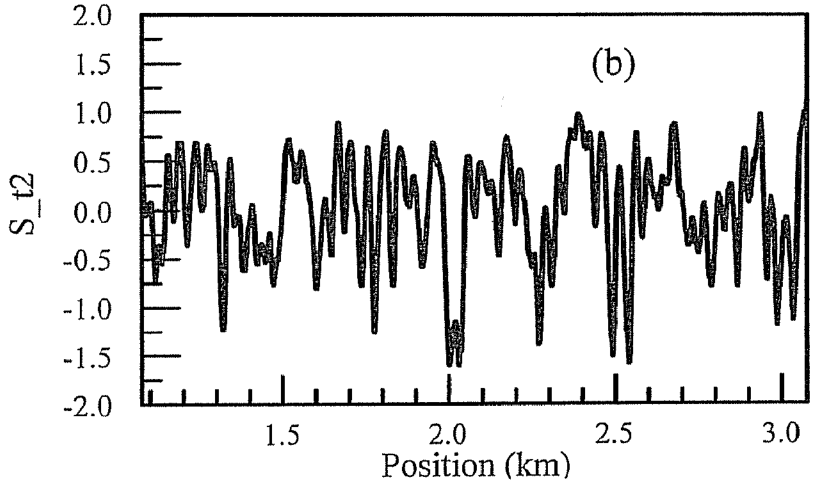

In another embodiment, the data can be processed in a different manner to extract the location of the disturbance. Polarization related information, which carries the information related to a local disturbance, is, in general, embedded in the backscattered trace that depicts fiber attenuation. However, the center line of the backscattered trace has a negative slope. Accordingly, in a first step, the negative slope line was subtracted from the backscattered trace, so that only the information related to the local information was present, which we call a "processed trace." The original backscattered traces can be labeled as Pb(z) and Pa(z) respectively, for the backscattered traces before and after the disturbance. The removal of the linear slope resulting in the processed trace is described by the equation: $S_i(z)=P_i(z)-(c_i+d_iz)$, where i=b or a, representing traces obtained 'before' and 'after' respectively, and $c_i$ and $d_i$ are the two parameters that uniquely determine the straight line taken out from $P_i(z)$, which are determined by linear regression resulting in a better fitting of the overall trace. As an example, the processed trace at t1 and t2 for the first sensor fiber is shown in FIGS. 13A and 13B respectively.

Figure 13C:
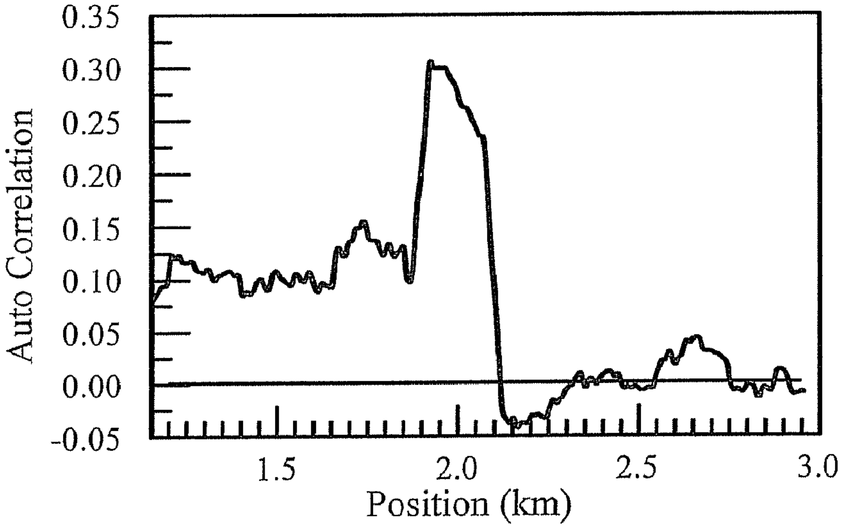
FIG. 13C shows an autocorrelation function of the processed traces of FIGS. 13A and 13B.

The location of the disturbance can be obtained by building the autocorrelation function of the two processed traces. We calculate the autocorrelation according to the following equation:

$$\tau(z) = \frac{1}{w}\int_{z-0.5w}^{z+0.5w} S_b(z')S_a(z')\,dz'$$

where w is the width of the window used to calculate the autocorrelation. The window width w can take a value from a range. The width w, for example, can be between 50 meters and 1,000 meters. Using a window width of 200 meters, as an example, we calculate the autocorrelation function as shown in FIG. 13C. The first position at which the autocorrelation curve crosses the zero level from a positive value is the position of the disturbance. In this case, the position of the disturbance is located at 4.12 km (relative to the output port of the OTDR), which agrees well with the first method described above.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A detection system comprising:

(i) a length of optical fiber; and (iii) an OTDR coupled to said fiber, said OTDR comprising (a) a radiation source providing pulsed radiation to said fiber, (b) a detector detecting radiation that is backscattered through the fiber, and (c) a processor capable of analyzing the variation of the radiation that is backscattered through the fiber; wherein at least two polarization dependent sensing elements are positioned along the length of optical fiber.

2. The detection system of claim 1, wherein at least one polarization dependent sensing element comprises optical fiber subjected to mechanically induced microbending.

3. The detection system of claim 2, wherein at least one polarization dependent sensing element comprises a microbending gear rack.

4. The detection system of claim 3, wherein the microbending gear rack is at least 1 centimeter in length and induces a bend period of from 0.5 millimeters to 2 millimeters to the optical fiber and induces a bend amplitude of from 25 μm to 2 millimeters to the optical fiber.

5. The detection system of claim 1, wherein the length of the optical fiber comprises a plurality of airlines and at least one polarization dependent sensing element comprises a region wherein the airlines are absent.

6. The detection system of claim 1, wherein said detection system is capable of detecting a fiber disturbance within 20 meters of the actual location of the disturbance.

7. The detection system of claim 1, wherein each polarization dependent sensing element induces a polarization dependent loss of at least 0.2 dB along the length of optical fiber.

8. The detection system of claim 1, wherein each polarization dependent sensing element induces a polarization dependent loss of at least 10 dB along the length of optical fiber.

9. The detection system of claim 1, wherein at least four polarization dependent sensing elements are positioned along the length of optical fiber, wherein the distance between each polarization dependent sensing element is at least 50 meters.

10. A method for detecting a disturbance along a length of optical fiber comprising the steps of:

(i) emitting pulsed radiation into a length of optical fiber;

(ii) measuring radiation that is backscattered through the optical fiber; and (iii) analyzing the variation of said measured radiation to produce information related to change in said measured radiation over time along the length of the fiber; wherein at least two polarization dependent sensing elements are positioned along the length of optical fiber.

11. The method of claim 10, wherein at least one polarization dependent sensing element comprises optical fiber subjected to mechanically induced microbending.

12. The method of claim 11, wherein at least one polarization dependent sensing element comprises a microbending gear rack.

13. The method of claim 12, wherein the microbending gear rack is at least 1 centimeter in length and induces a bend period of from 0.5 millimeters to 2 millimeters to the optical fiber and induces a bend amplitude of from 25 μm to 2 millimeters to the optical fiber.

14. The method of claim 10, wherein the length of the optical fiber comprises a plurality of airlines and at least one polarization dependent sensing element comprises a region wherein the airlines are absent.

15. The method of claim 10, wherein the step of measuring radiation that is backscattered through the optical fiber comprises measuring at least one background reference trace and the step of analyzing the variation of said measured radiation comprises analyzing the variation of the difference between the at least one background reference trace and radiation backscattered over time along the length of the fiber.

16. The method of claim 10, wherein said method is capable of detecting a fiber disturbance within 20 meters of the actual location of the disturbance.

17. The method of claim 10, wherein each polarization dependent sensing element induces a polarization dependent loss of at least 0.2 dB along the length of optical fiber.

18. The method of claim 10, wherein each polarization dependent sensing element induces a polarization dependent loss of at least 10 dB along the length of optical fiber.

19. The method of claim 10, wherein at least four polarization dependent sensing elements are positioned along the length of optical fiber, wherein the distance between each polarization dependent sensing element is at least 50 meters.

20. The method of claim 10, wherein said step of analyzing the variation of said measured radiation comprises calculating: (i) a sliding standard deviation trace; or (ii) an auto correlation function of processed OTDR traces.

* * * * *